# 2,860,986

PARTIALLY ACETALIZED POLYVINYL ALCOHOL CONTAINING ACTIVE HALOGEN

Donald A. Smith and Cornelius C. Unruh, Rochester, N. Y., assignors to Eastman Kodak Company, Rochester, N. Y., a corporation of New Jersey No Drawing. Application August 31, 1956
Serial No. 607,258

6 Claims. (Cl. 96—114)

This invention relates to copolymers of vinyl alcohol and vinyl derivatives containing active halogen which are capable of insolubilization by treatment with ammonia, amines or amino acids, and more particularly to copolymers of vinyl alcohol and vinyl haloacetamino acetals, i. e. partially acetalized polyvinyl alcohols containing active halogen, and to process for preparing the same.

It is known that polyvinyl carboxylic esters such as polyvinyl acetate can be readily hydrolyzed to polyvinyl alcohol and the latter acetalized with an aminoacetal such as β-amino diethyl acetal to give copolymers which are useful as gelatin substitutes in photographic elements and which can be hardened with formaldehyde and similar compounds. However, for certain photographic processes, as in color photography, it has been found that hardening with formaldehyde is undesirable. Consequently, it would be very advantageous to provide a gelatin substitute that could be insolubilized by means other than formaldehyde.

One method that we discovered appeared to have some possibilities. It comprised copolymerizing vinyl acetate with N-allylchloroacetamide, followed by hydrolysis, and then displacement of the chlorine by ammonia or amines. The latter products could then be converted to ureido or guanidino derivatives which could be readily crosslinked. However, this method had the disadvantage that the proportion of halogenated monomer which could be induced to copolymerize with the vinyl ester was very limited. It was found that quantities of this monomer in excess of 3 percent, based on the total weight of monomers, caused severe repression of polymerization so that it was not possible to obtain copolymers in the desired percentage ranges that would be expected to yield fully efficacious gelatin substitutes. Consequently, this species has only limited photographic utility.

We have now found that the reaction of a preformed polyvinyl alcohol with 2-haloacylamino acetals give vinyl alcohol copolymers containing sufficient amount of the desired active halogen to cover the complete range of products and showing properties making them particularly useful as gelatin substitutes in photographic layers, and more particularly as vehicles for silver halide emulsions or layers, and further that coated layers thereof on suitable supports can be readily insolubilized, i. e. crosslinked with a large number of mild reagents such as with ammonia or amino acids, without causing any detrimental effects, such as found with formaldehyde under the same conditions, on any of the active photographic components present in such layers. Accordingly, our new class of vinyl alcohol copolymers containing chloroacetamino acetal groups are outstanding as gelatin substitutes in photographic materials.

It is, accordingly, an object of the invention to provide a new class of vinyl alcohol copolymers. Another object is to provide a process for preparing the same. Another object is to provide compositions of the said copolymers with light-sensitive silver halide dispersed therein. Another object is to provide photographic elements having a support material and at least one of said compositions coated thereon. Another object is to provide a process for insolubilizing photographic layers containing said copolymers. Other objects will become apparent hereinafter.

In accordance with the invention, we prepare our new class of vinyl alcohol copolymers by heating, at from 40° C. to the refluxing temperature of the reaction mixture, a polyvinyl ester such as polyvinyl acetate, propionate, butyrate, etc., in the presence of a hydrolyzing agent, for example, a strong mineral acid such as hydrochloric acid, sulfuric acid, etc., in a nonsolvent medium such as a lower alkanol, e. g. methanol, and in the presence of an acetalizing agent, chloroacetylamino acetal, in the proportions of from 1 to 20 gram moles of the polyvinyl acetate to each gram mole of the chloroacetamino acetal, to give the soluble products of the invention consisting essentially of from 85 to 96.5 mole percent of recurring vinyl alcohol units and from 15 to 3.5 mole percent of recurring vinyl acetal units (haloacetylamino acetal derivatives of vinyl alcohol) represented by the following structures:

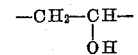

and

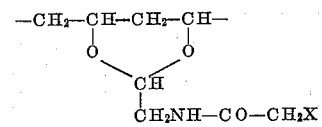

wherein X represents a halogen atom such as chlorine, bromine, etc. In some cases, some residual vinyl ester groups may or may not also be present, depending on the completeness of the hydrolysis, but in any case the content thereof is considerably less than 1% by weight and can be considered as an unavoidable contaminant. It will be understood that the above described reaction may also be conducted in two separate steps, i. e. hydrolysis followed by acetalization.

The above defined vinyl alcohol copolymers may be readily insolubilized by treatment with relatively mild reagents such as solutions or dispersions of ammonia and aliphatic amino acids such as glycine, alanine, aspartic acid, glutamic acid, etc., i. e. aliphatic amino acids containing preferably from 2 to 6 carbon atoms, but preferably by treating the copolymers with ammonia vapors or with aqueous solutions of lysine. Where the copolymer is employed as a vehicle for silver halide emulsions, it is advantageous to coat the emulsion on a suitable base, treat the wet coating with ammonia vapors and dry, and where it is desired to employ lysine as the insolubilizing agent advantageously this can be done by incorporating the lysine directly in the said silver halide emulsion. A less preferable method is to treat the coated and dried emulsion layer with an aqueous solution of the lysine. Facts obtained indicate that the insolubilization is a crosslinking reaction whereby halogen atoms on different polymer chains react with ammonia to split off HCl and give a nitrogen linking unit —NH— and with lysine to give a nitrogen linking such as

This kind of cross-linking is in marked contrast to that obtained by means of active methylene groups in the polymer sidechains with certain aldehydes, for example, where a polyvinyl alcohol has been partially acetalized with a cyanoacetamidoacetaldehyde and then insolubilized with formaldehyde or a dialdehyde such as succinaldehyde, terephthalaldehyde, etc., to give products likewise having utility as gelatin substitutes in photographic processes.

The following examples with serve further to illustrate the manner of preparing the copolymers of the invention and the photographic applications thereof.

EXAMPLE 1

To a solution of 30.0 g. (0.35 mol.) of polyvinyl acetate in 70 g. of methanol were added 5.0 g. (0.024 mol.) of chloroacetamino acetal, prepared by reacting aminoacetal with chloroacetyl chloride [Beilsteins Hand. Org. Chem., 4th ed., vol. III–IV, page 450 (1929)], in 50 cc. of methanol and 5 cc. of concentrated hydrochloric acid in 30 cc. of methanol. The mixture was kept at 50° C. for 20 hours, and the resultant gel was then ground and washed with methanol. The product was purified by dissolving the gel in warm water and precipitating in methanol. The analytical data for the above example, together with a series of other examples wherein the proportions of the reactants were varied, are given in the following table:

Table

| Example No. | Reactants, grams | | Copolymer Products | | | |
|---|---|---|---|---|---|---|
| | Polyvinyl Acetate | Chloroacet-amino Acetal | Analysis, percent by weight | | Calculate, Mole, percent of— | |
| | | | Nitrogen | Chlorine | Vinyl Alcohol | Vinyl Acetal |
| 1 | 30 | 5.0 | 1.1 | 2.8 | 96.0 | 4.0 |
| 2 | 30 | 10.0 | 2.2 | 5.3 | 91.0 | 6.0 |
| 3 | 30 | 14.0 | 2.2 | 6.0 | 90.2 | 9.8 |
| 4 | 30 | 18.0 | 2.9 | 7.6 | 86.1 | 13.9 |

In the above table the calculated mole percent is an average figure based on the found amounts of nitrogen and chlorine in each of the examples, and represents the chemical constitution of the copolymers of the respective examples. These polymeric products, when coated from dilute aqueous solutions thereof, gave clear, continuous films that were rendered insoluble on exposure to ammonia fumes. Insoluble films were also obtained from aqueous solutions of these products containing an amino acid, e. g. lysine (up to an amount equivalent to the chlorine content) on coating the solution and drying.

In place of the chloroacetamino acetal in the above examples, there can be substituted an equivalent amount of some other haloacetamino acetal, for example, bromoacetamino acetal which can be prepared by the general method mentioned above by reacting an aminoacetal with bromoacetyl chloride, to give the copolymers of the invention comprising vinyl alcohol units and bromoacetamino acetal units of vinyl alcohol in the specified proportions.

EXAMPLE 5

This example illustrates the use of the products of the invention in a silver halide emulsion as a vehicle.

A silver bromoiodide emulsion was prepared, in general, by the method set forth by A. P. H. Trivelli and W. F. Smith, in The Photographic Journal, page 330–31, May 1939, using in place of the gelatin an 8.6% solution of the chloroacetylaminoacetal of polyvinyl alcohol (prepared according to above Example 2) as the vehicle. The emulsion contained 0.5% of boric acid, based on the weight of the copolymer, and a suitable spreading agent. The emulsion melt was coated on a polyvinyl alcohol subbed base to a wet coating thickness of about 0.008-inch, hardened by fuming the wet coating with ammonia for 30 seconds, drying at 125° F. and aging for 7 days at 50% relative humidity and 75° F. On exposure of the coating, 0.04 second through a step wedge to light of 3000 K. color temperature, followed by 5 minutes development in a developer solution of the formula:

| | | |
|---|---|---|
| Water | cc | 750 |
| p-Methylaminophenol sulfate | g | 0.3 |
| Sodium sulfite (desiccated) | g | 38.0 |
| Hydroquinone | g | 6.0 |
| Sodium carbonate monohydrate | g | 22.5 |
| Potassium bromide | g | 0.9 |
| Citric acid | g | 0.7 |
| Sodium bisulfite | g | 1.4 |

Water added to make up a total volume of 1 liter.

fixing in a solution of sodium thiosulfate, washing and drying, the processed film showed a contrast of 1.90 and a fog level of 0.04. This result indicated that the copolymers of the invention were excellent gelatin substitutes in photographic emulsions or layers.

By proceeding as set forth in the above examples, any other copolymers of the invention coming within the specified limits of from 85 to 96.5 mole percent of vinyl alcohol units and from 15 to 3.5 mole percent of chloroacetylaminoacetal units will give generally similar good photographic results when employed as vehicles. However, the copolymers of the invention can also be employed as protective coatings over emulsion layers, as filter layers containing appropriate dyes, as backing layers containing antihalation or antistatic ingredients, as separation layers between emulsions, etc., in fact, as a substitute for gelatin in practically any photographic applications wherein gelatin is employed.

What we claim is:

1. A vinyl alcohol copolymer consisting essentially of from 85 to 96.5 mole percent of recurring vinyl alcohol units of the structure

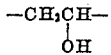

and from 15 to 3.5 mole percent of recurring vinyl acetal units of the structure

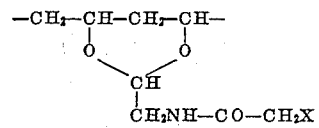

wherein X represents a member selected from the group consisting of a chlorine atom and a bromine atom, said copolymer being capable of being insolubilized by treatment with a nitrogen base compound selected from the group consisting of ammonia vapor and an aqueous solution of lysine.

2. A vinyl alcohol copolymer consisting essentially of from 85 to 96.5 mole percent of recurring vinyl alcohol units of the structure

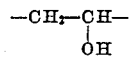

and from 15 to 3.5 mole percent of recurring vinyl acetal units of the structure

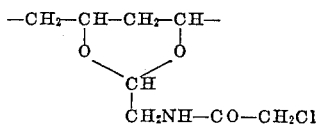

capable of being insolubilized by treatment with a nitrogen base compound selected from the group consisting of ammonia vapor and an aqueous solution of lysine.

3. A photographic emulsion comprising a mixture of silver halide and a vinyl alcohol copolymer consisting essentially of from 85 to 96.5 mole percent of recurring vinyl alcohol units of the structure

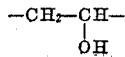

and from 15 to 3.5 mole percent of recurring vinyl acetal units of the structure

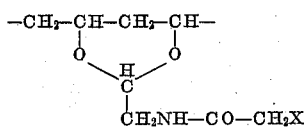

wherein X represents a member selected from the group consisting of an atom of chlorine and an atom of bromine, the said emulsion being capable of being insolubilized by treatment with a nitrogen base compound selected from the group consisting of ammonia vapor and aqueous lysine.

4. A photographic emulsion comprising a mixture of silver halide and a vinyl alcohol copolymer consisting essentially of from 85 to 96.5 mole percent of recurring vinyl alcohol units of the structure

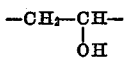

and from 15 to 3.5 mole percent of recurring vinyl acetal units of the structure

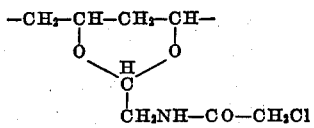

capable of being insolubilized by treatment with a nitrogen base compound selected from the group consisting of ammonia vapor and an aqueous solution of lysine.

5. A photographic element comprising a hydrophobic film support and having thereon at least one silver halide emulsion layer containing as the dispersion agent for the silver halide a vinyl alcohol copolymer consisting essentially of from 85 to 96.5 mole percent of recurring vinyl alcohol units of the structure

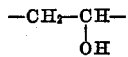

and from 15 to 3.5 mole percent of recurring vinyl acetal units of the structure

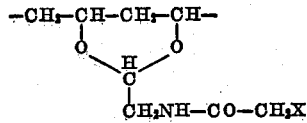

wherein X represents a member selected from the group consisting of an atom of chlorine and an atom of bromine, the said copolymer being capable of being insolubilized by treatment with a nitrogen base compound selected from the group consisting of ammonia vapor and an aqueous solution of lysine.

6. A photographic element comprising a hydrophobic film support and having thereon at least one silver halide emulsion layer containing as the dispersion agent for the silver halide a vinyl alcohol copolymer consisting essentially of from 85 to 96.5 mole percent of recurring vinyl alcohol units of the structure

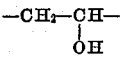

and from 15 to 3.5 mole percent of recurring vinyl acetal units of the structure

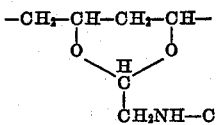

capable of being insolubilized with a nitrogen base compound selected from the group consisting of ammonia vapor and and an aqueous solution of lysine.

References Cited in the file of this patent

UNITED STATES PATENTS

| | | |
|---|---|---|
| 2,276,322 | Lowe | Mar. 17, 1942 |
| 2,739,059 | Priest et al. | Mar. 20, 1956 |
| 2,747,998 | Sayre | May 29, 1956 |

FOREIGN PATENTS

| | | |
|---|---|---|
| 509,012 | Great Britain | July 6, 1939 |

OTHER REFERENCES

Fisher: Berichte Deut. Chem. Gesel., vol. 41, pages 2860–2875 (1910).